US009959733B2

United States Patent
Gu et al.

(10) Patent No.: US 9,959,733 B2
(45) Date of Patent: May 1, 2018

(54) DEVICES, SYSTEMS, AND METHODS FOR DETECTING FALLS (71) Applicant: CASSIA NETWORKS INC., San Jose, CA (US)

(72) Inventors: Daguang Gu, Beijing (CN); Kunpeng Zhang, Beijing (CN); Tai Seng Chen, San Jose, CA (US); Fuyong Zhao, San Jose, CA (US)

(73) Assignee: CASSIA NETWORK INC., San Jose, CA (US)

( * ) Notice: Subject to any disclaimer, the term of this patent is extended or adjusted under 35 U.S.C. 154(b) by 0 days. days.

(21) Appl. No.: 14/842,044

(22) Filed: Sep. 1, 2015

(65) Prior Publication Data
US 2017/0061766 A1    Mar. 2, 2017

(51) Int. Cl.
G08B 23/00     (2006.01)
G08B 21/04     (2006.01)
G01P 1/07      (2006.01)
G08B 29/18     (2006.01)
G08B 25/00     (2006.01)
G08B 25/01     (2006.01)

(52) U.S. Cl.
CPC ............ G08B 21/0446 (2013.01); G01P 1/07 (2013.01); G08B 21/043 (2013.01); G08B 29/183 (2013.01); *G08B 25/009* (2013.01); *G08B 25/016* (2013.01)

(58) Field of Classification Search
CPC .......................... G08B 21/043; G08B 21/0446
USPC ....... 340/573.1, 539.13, 669, 573.7; 600/595
See application file for complete search history.

(56) References Cited

U.S. PATENT DOCUMENTS

| | | | |
|---|---|---|---|
| 8,952,818 B1 | 2/2015 | Zhang | |
| 9,047,907 B2* | 6/2015 | Nguyen | G11B 19/042 |
| 9,293,025 B2* | 3/2016 | Zhang | G08B 21/0446 |
| 2007/0296571 A1* | 12/2007 | Kolen | A61B 5/0002 |
| | | | 340/539.11 |
| 2011/0246114 A1* | 10/2011 | Jin | G08B 21/0446 |
| | | | 702/94 |

(Continued)

FOREIGN PATENT DOCUMENTS

| | | |
|---|---|---|
| GB | 2507787 A | 5/2014 |
| WO | 2007/057692 A2 | 5/2007 |

OTHER PUBLICATIONS

International Search Report and Written Opinion for Application No. PCT/US2016/049474, dated Nov. 11, 2016, 12 pages.

*Primary Examiner* — Phung Nguyen (57) ABSTRACT

Devices, systems, and methods are disclosed for detecting falls and transmitting notifications. One embodiment includes a wearable device. The wearable device may include a first sensor configured to collect acceleration data, and at least one of a second sensor configured to collect pressure data or a third sensor configured to collect temperature data. The wearable device may also include an antenna and a processor. The wearable device may also include a non-transitory computer-readable storage medium storing instructions that, when executed by the processor, cause the processor to receive the acceleration data and at least one of the pressure data or the temperature data, process the acceleration data and at least one of the pressure data or the temperature data, and control, when the processor determines that a person falls, the antenna to transmit a signal.

20 Claims, 6 Drawing Sheets

(56) References Cited

U.S. PATENT DOCUMENTS

| | | | |
|---|---|---|---|
| 2011/0298613 A1 | 12/2011 | Ben Ayed | |
| 2012/0109575 A1* | 5/2012 | Balbus | A61B 5/1117 702/141 |
| 2013/0054180 A1 | 2/2013 | Barfield | |
| 2013/0082842 A1* | 4/2013 | Balazs | G08B 21/04 340/573.1 |
| 2014/0091934 A1* | 4/2014 | Vallance | G08B 21/0446 340/573.1 |
| 2015/0212647 A1* | 7/2015 | Kim | G02B 27/017 345/173 |
| 2015/0269825 A1* | 9/2015 | Tran | G08B 21/0446 340/539.12 |
| 2016/0038061 A1* | 2/2016 | Kechichian | A61B 5/4035 600/301 |
| 2016/0210838 A1* | 7/2016 | Yan | G08B 21/043 |

* cited by examiner

DEVICES, SYSTEMS, AND METHODS FOR DETECTING FALLS

TECHNICAL FIELD

The present application relates to wearable devices, and more particularly, to devices, systems, and methods for detecting falls of people wearing the devices.

BACKGROUND

Falling accidentally is a serious safety concern, especially if the person is old or alone. For example, a person may stumble or trip and fall from an upright position to a ground while walking. A person may also lose his/her balance and fall from a chair to a low ground. In some situations, the person may be elderly, alone, or for some reason, not receiving help from other people. It is, therefore, desirable to have fall detectors that detect such fall accidents and make sure that the person receives help.

Some conventional technologies for solving the above-mentioned problem include video monitoring and acoustic vibration monitoring. However, video monitoring requires installation of expensive apparatus and has a high false detection rate, and acoustic vibration monitoring is usually implemented indoor, therefor is limited in area coverage.

SUMMARY

One aspect of the present disclosure is directed to a wearable device for detecting falls and transmitting notifications. The wearable device may include a first sensor configured to collect acceleration data, and at least one of a second sensor configured to collect pressure data or a third sensor configured to collect temperature data. The wearable device may also include an antenna and a processor. The wearable device may also include a non-transitory computer-readable storage medium storing instructions that, when executed by the processor, cause the processor to receive the acceleration data and at least one of the pressure data or the temperature data, process the acceleration data and at least one of the pressure data or the temperature data, and control, when the processor determines that a person falls, the antenna to transmit a signal.

Another aspect of the present disclosure is directed to a method for determining if a person falls and transmitting notifications. The method may include collecting, by a first sensor of a wearable device, acceleration data, and collecting at least one of pressure data by a second sensor of the device, or temperature data by a third sensor of the device. The method may also include receiving, by a processor of the device, the acceleration data and at least one of the pressure data or the temperature data. The method may also include processing, by the processor, the acceleration data and at least one of the pressure data or the temperature data, and controlling, by the processor and when the processor determines that the person falls, the antenna to transmit a signal.

Another aspect of the present disclosure is directed to a system for determining if a first person falls and transmitting notifications. The system may include a wearable first device configured to collect acceleration data and collect at least one of pressure data or temperature data. The system may include the wearable first device further configured to process the acceleration data and at least one of the pressure data or the temperature data, and transmit a signal if the first device determines that the first person falls. The system may also include a second device configured to receive the signal.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this specification, illustrate several embodiments and, together with the description, serve to explain the disclosed principles.

DETAILED DESCRIPTION

Reference will now be made in detail to exemplary embodiments of the invention, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention as recited in the appended claims.

Figure 1:
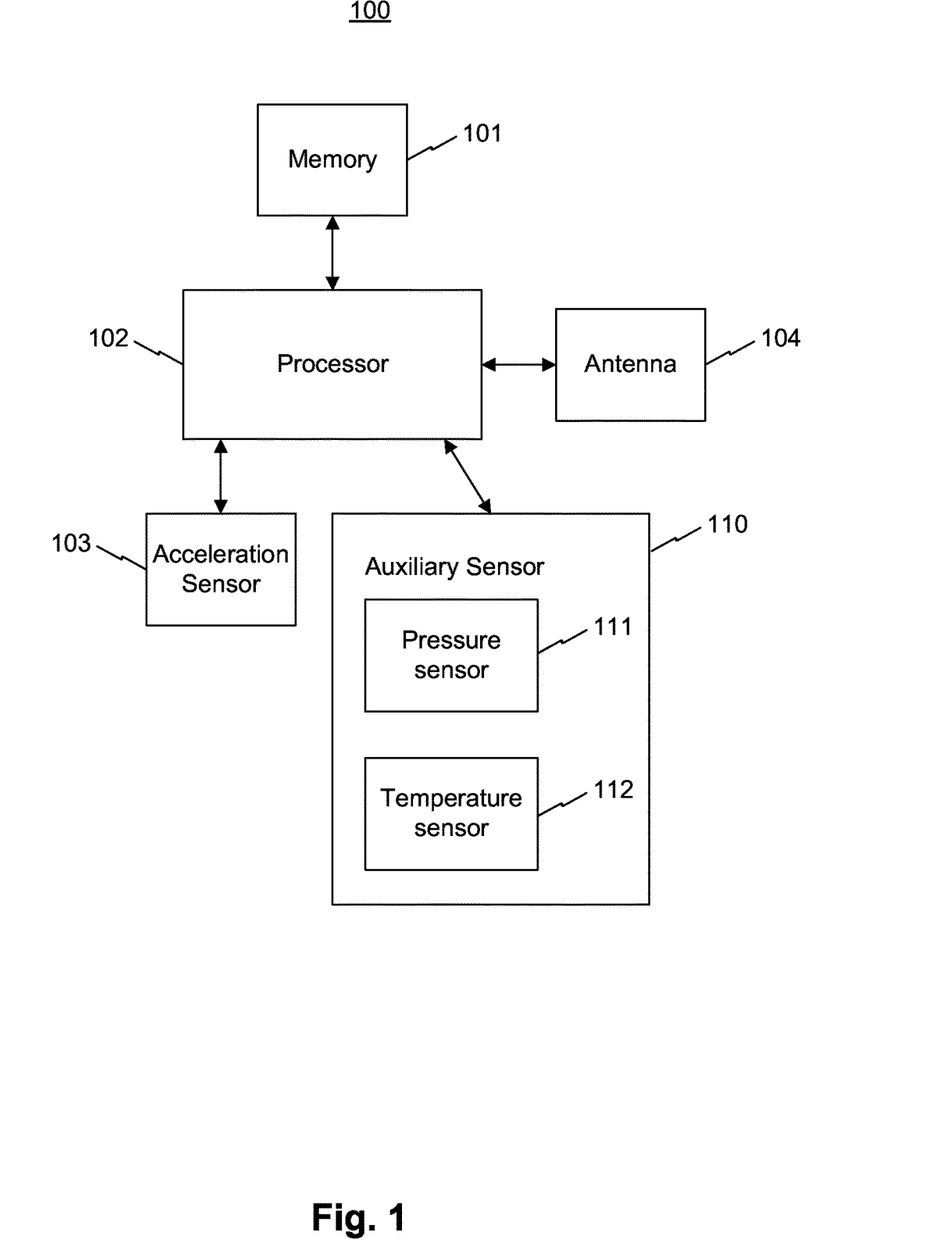
FIG. 1 is a block diagram illustrating a device for detecting falls and transmitting notifications according to an exemplary embodiment.

FIG. 1 is a block diagram illustrating a device 100 for detecting falls and transmitting notifications according to an exemplary embodiment. The device 100 may comprise a number of components. Some components may be optional. The device 100 may be wearable by a user.

In one embodiment, the device 100 may comprise a memory 101, e.g., non-transitory computer-readable storage medium for storing instructions, a processor 102, an acceleration sensor 103 configured to collect acceleration data, an auxiliary sensor 110, and an antenna 104. The acceleration sensor 103 may include a 3-axis acceleration sensor or a 9-axis acceleration sensor. The 9-axis acceleration sensor may include a 3-axis accelerometer, a 3-axis compass, and a 3-axis gyroscope. The name "auxiliary sensor" is to differentiate sensor 110 from sensor 103 and may not imply sensor levels or relationships. The sensor 110 may include a pressure sensor 111 configured to collect pressure data and/or a temperature sensor 112 configured to collect temperature data. The pressure sensor 111 may measure pressure. The pressure measured each time may correspond to a height of the device 100. The sensors may be microelectromechanical systems (MEMS) sensors. The sensors may collect data of a person wearing the device 100 and/or that of an environment surrounding the sensors.

In some embodiments, in operation, the processor 102 may receive the acceleration data and at least one of the pressure data or the temperature data. The processor 102 may process the acceleration data and at least one of the pressure data or the temperature data. When the processor 102 determines that a person falls, the processor 102 causes the antenna 104 to transmit a signal. The signal may be transmitted through a communication network, including, for example, Bluetooth, Low Energy Bluetooth, Wifi, 3G, 4G, LTE, WiMax, radio, satellite, or any combination thereof. More exemplary functions of components 102, 103, and 104 will be described later in connection with FIGS. 3 and 4. The memory 101 may store instructions that, when executed, cause the processor 102 to perform the above functions.

In some embodiments, the signal may include a notification indicating that the person falls, or a notification indicating that the person is not wearing the device 100. The notification may take the form of, for example, a text message, a multimedia message, a voice mail, a phone call, an email, an alert, an alarm, a mobile phone application notification, or any combination thereof.

In some embodiments, the signal may further comprise location information of the person, such that a receiver of the signal will know where to find the person based on the location information. The location information may be determined by a positioning module described in FIG. 2, a third party device described in FIG. 5, and/or an apparatus described in FIGS. 5 and 6.

Figure 2:
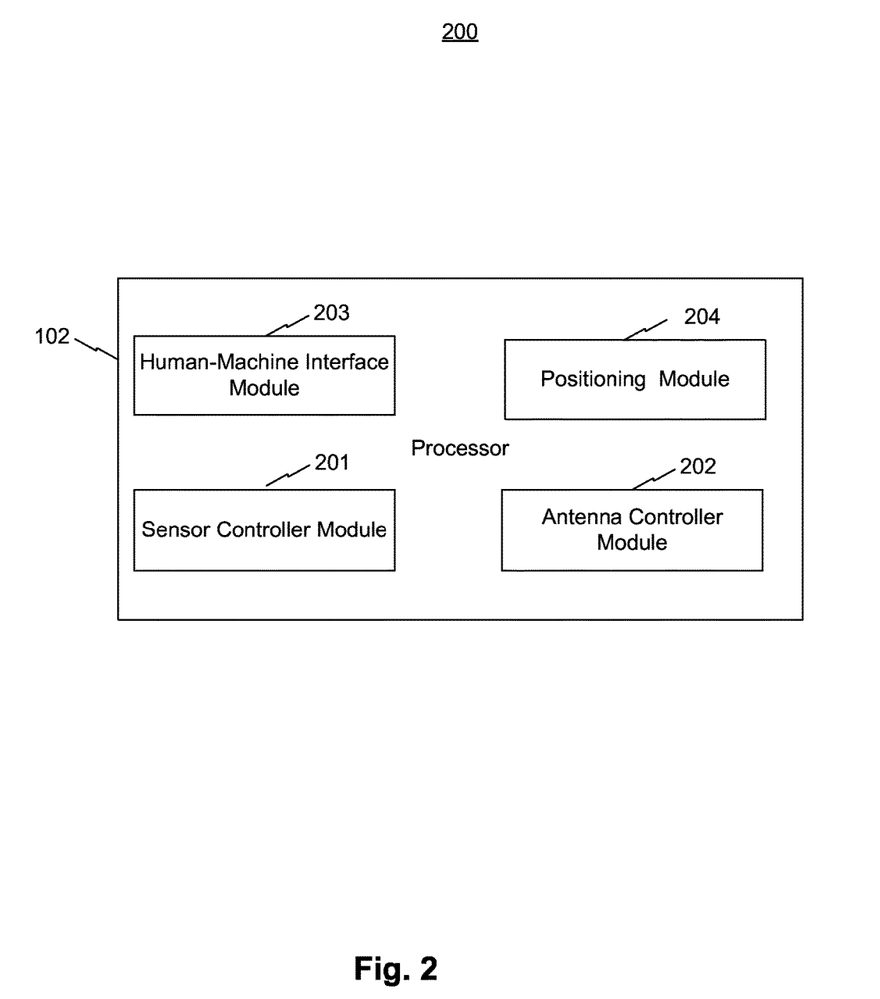
FIG. 2 is a block diagram illustrating a processor of a device for detecting falls and transmitting notifications according to an exemplary embodiment.

FIG. 2 is a block diagram illustrating a processor 102 according to an exemplary embodiment 200. The processor 102 may comprise a number of components. Some components may be optional.

In one embodiment, the processor 102 may comprise a sensor controller module 201, an antenna controller module 202, a human-machine interface module 203, and a positioning module 204. The sensor controller module 201, antenna controller module 202, and human-machine interface module 203 may be implemented by software and/or hardware. The positioning module 204 may also be implemented by software and/or hardware. The positioning module 204 may be a Global Positioning System (GPS) module.

In some embodiments, the sensor controller module 201 may communicate with and control the acceleration sensor 103, and at least one of the pressure sensor 111 or the temperature sensor 112. In some embodiments, the antenna controller module 202 may communicate with and control the antenna 104. In one example, the antenna controller module 202 may be a Bluetooth controller module. In some embodiments, the device 100 may further comprise an input interface, one or more buttons and LED lights. A person may input information to the input interface. The information may include gender information and/or height information. The buttons may include an emergency button. A person may manually trigger the emergency button to call for assistance. The human-machine interface module 203 may control the input interface and the buttons and the LED lights. The positioning module 204 may determine a location of a person wearing the device 100.

Figure 3:
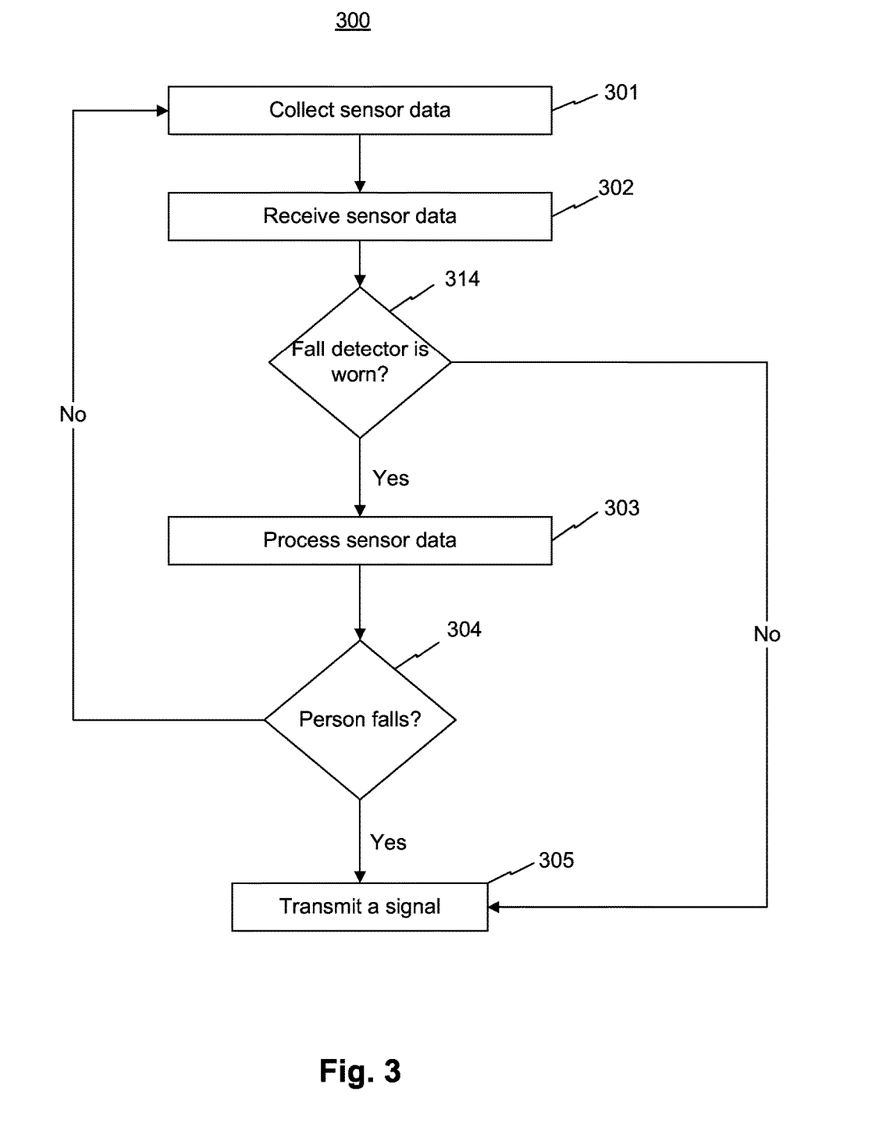
FIG. 3 is a flow diagram illustrating a method for determining if a person falls and transmitting notifications according to an exemplary embodiment.

FIG. 3 is a flow diagram illustrating a method 300 for determining if a person falls and transmitting notifications according to an exemplary embodiment. Method 300 may comprise a series of steps. Some steps may be optional. Some steps, for example step 301, may be performed continuously. Some steps may be performed simultaneously, for example, step 301 may be performed when any other step is being performed.

At step 301, one or more sensors of a wearable device may collect sensor data. The sensor data may be time-dependent or location-dependent. The sensor data collection process may be continuous as long as the wearable device is turned on. The sensors may include at least one of an acceleration sensor, a pressure sensor, or a temperature sensor. The acceleration sensor may include a 3-axis acceleration sensor or a 9-axis acceleration sensor. The 9-axis acceleration sensor may include a 3-axis accelerometer, a 3-axis compass, and a 3-axis gyroscope. The sensor data may include at least one of acceleration data, pressure data, or temperature data. The pressure sensor may measure pressure. The pressure measured each time may correspond to a height of the wearable device.

At step 302, a processor of the wearable device may receive at least one of the acceleration data from the acceleration sensor, the pressure data from the pressure sensor, or the temperature data from the temperature sensor. The processor may control a sensor controller module to communicate with and/or control at least one of the acceleration sensor, the pressure sensor, or the temperature sensor.

At step 314, the processor of the wearable device may determine if the wearable device (fall detector) is worn. In some embodiments, if the processor of the wearable device determines that the wearable device is worn, proceed to step 303; if the processor of the wearable device determines that the wearable device is not worn, proceed to step 305. The determination may be based on comparing the sensor data received over a predetermined period of time. In one example, the processor of the wearable device may determine that the wearable device is not worn if variation in the data received for the past 24 hours is within a predetermined range.

At step 303, the processor of the wearable device may process the data received. More exemplary sub-steps of step 303 will be described later in connection with FIG. 4.

At step 304, the processor of the wearable device may determine if a person falls. More exemplary sub-steps of step 304 will be described later in connection with FIG. 4. In some embodiments, if the processor of the wearable device determines that a person falls, proceed to step 305; if the processor of the wearable device does not determine that a person falls, the sensors of the wearable device may keep collecting sensor data.

At step 305, the processor of the wearable device may transmit a signal. In one example, the processor may control an antenna to transmit a signal. In another example, the processor may control an antenna controller module to communicate with and/or control an antenna. The antenna controller module may be a Bluetooth controller module. The signal may be transmitted through a communication network, including, for example, Bluetooth, Low Energy Bluetooth, Wifi, 3G, 4G, LTE, WiMax, radio, satellite, or any combination thereof.

In some embodiments, the signal may include a notification indicating that the person falls if step 305 is triggered by step 304, or a notification indicating that the person is not wearing the wearable device if step 305 is triggered by step 314. The notification may take the form of, for example, a text message, a multimedia message, a voice mail, a phone call, an email, an alert, an alarm, a mobile phone application notification, or any combination thereof. A receiver of the notification including, for example a caregiver, may react to the situation appropriately, such that the person receives assistance if the notification indicates that the person falls or the person is checked on if the notification indicates that the person is not wearing the wearable device.

In some embodiments, the signal may further comprise location information of the person, such that a receiver of the signal will know where to find the person based on the location information. The location information may be determined by a positioning module described in FIG. 2, a third party device described in FIG. 5, and/or an apparatus described in FIGS. 5 and 6.

Figure 4:
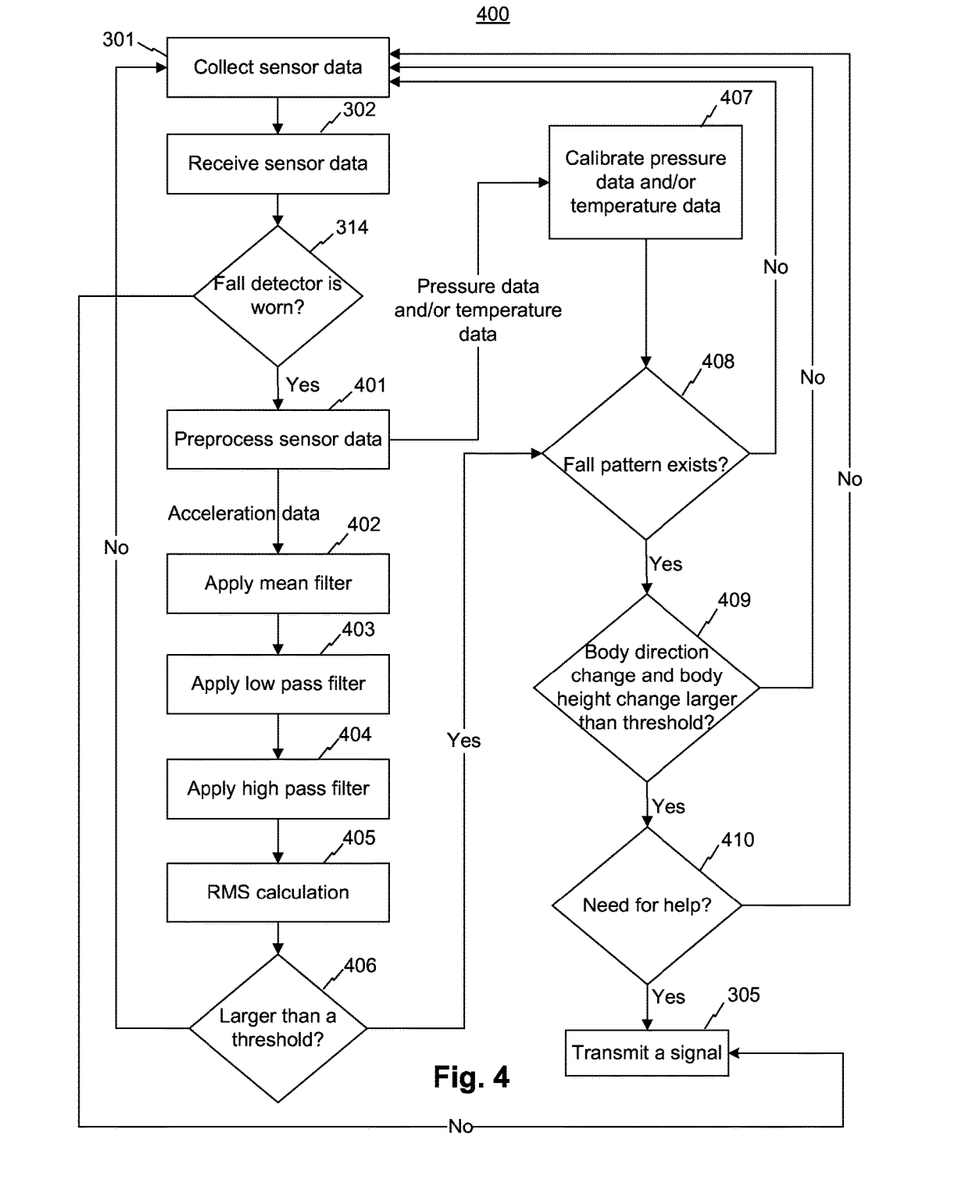
FIG. 4 is a flow diagram illustrating a method for determining if a person falls and transmitting notifications according to another exemplary embodiment.

FIG. 4 is a flow diagram illustrating another method 400 for determining if a person falls and transmitting notifications according to an exemplary embodiment. The method 400 may comprise a number of steps. Some steps may be optional. Some steps, for example step 301, may be performed continuously. Some steps may be performed simultaneously, for example, step 301 may be performed when any other step is being performed. Step 303 of FIG. 3 may include steps 401-405 and 407 of FIG. 4. Step 304 of FIG. 3 may include steps 406 and 408-410 of FIG. 4.

At step 301, one or more sensors of a wearable device may collect sensor data. The sensor data may be time-dependent or location-dependent. The sensor data collection process may be continuous as long as the wearable device is turned on. The sensors may include at least one of an acceleration sensor, a pressure sensor, or a temperature sensor. The acceleration sensor may include a 3-axis acceleration sensor or a 9-axis acceleration sensor. The 9-axis acceleration sensor may include a 3-axis accelerometer, a 3-axis compass, and a 3-axis gyroscope. The sensor data may include at least one of acceleration data, pressure data, or temperature data. The pressure sensor may measure pressure. The pressure measured each time may correspond to a height of the wearable device.

At step 302, a processor of the wearable device may receive at least one of the acceleration data from the acceleration sensor, the pressure data from the pressure sensor, or the temperature data from the temperature sensor. The processor may control a sensor controller module to communicate with and/or control at least one of the acceleration sensor, the pressure sensor, or the temperature sensor.

At step 314, the processor of the wearable device may determine if the wearable device (fall detector) is worn. In some embodiments, if the processor of the wearable device determines that the wearable device is worn, proceed to step 401; if the processor of the wearable device determines that the wearable device is not worn, proceed to step 305. The determination may be based on comparing the sensor data received over a predetermined period of time. In one example, the processor of the wearable device may determine that the wearable device is not worn if variation in the data received for the past 24 hours is within a predetermined range.

At step 401, the processor of the wearable device may preprocess the data received in step 302. In some embodiments, step 401 may include at least one of cleaning, normalization, transformation, feature extraction, or selection of data. After step 401, preprocessed acceleration data may go to step 402, and preprocessed pressure data and/or preprocessed temperature data may go to step 407.

In some embodiments, steps 402-404 may be performed in any order.

At step 402, the processor of the wearable device may apply a mean filter to the preprocessed acceleration data. The mean filter may be a part of instructions stored in a memory of the wearable device.

At step 403, the processor of the wearable device may apply a low pass filter to the acceleration data from step 402. The low pass filter may be a part of instructions stored in the memory of the wearable device.

At step 404, the processor of the wearable device may apply a high pass filter to the acceleration data from step 403. The high pass filter may be a part of instructions stored in the memory of the wearable device.

At step 405, the processor of the wearable device may perform a root mean square (RMS) calculation to the filtered acceleration data.

At step 406, the processor of the wearable device may compare the calculated result from step 405 with a threshold. The threshold may be a part of instructions stored in a memory of the wearable device. In some embodiments, if the calculated result is larger than the threshold, proceed to step 408; if the calculated result is not larger than the threshold, the sensors of the wearable device may keep collecting sensor data.

At step 407, the processor of the wearable device may calibrate the preprocessed pressure data and/or the preprocessed temperature data from step 401.

At step 408, the processor of the wearable device may determine if a fall pattern exists, based on the calculated result (larger than the threshold) from step 406 and at least one of the calibrated pressure data or the calibrated temperature data from step 407. In one example, the processor may trace and compare time-related data patterns of the calculated result and the pressure data and/or temperature data.

In some embodiments, the processor may determine that a fall pattern exists if the data patterns follow a predetermined pattern. The predetermined pattern may be a part of the instructions stored in the memory of the wearable device.

In some embodiments, if the processor of the wearable device determines that a fall pattern exists, the processor may determine a detected movement and a time period for the detected movement from the fall pattern, and proceed to step 409; if the processor of the wearable device does not determine that a person falls, the sensors of the wearable device may keep collecting sensor data.

At step 409, the processor of the wearable device may determine if a body direction and a body height change, based on the data from step 408 and user information. The user information may be input to the wearable device through an input interface described in connection with FIG. 2. The user information may include gender information and/or height information. The data from step 408 may include data originally collected by the acceleration sensor, and by the pressure sensor and/or by the temperature sensor. The data collected by the acceleration sensor may include body directions. The data collected by the acceleration sensor may further include a change in body directions over a predetermined period of time. The data collected by the pressure sensor may include pressure measurements corresponding to heights of the wearable device at different times. The data collected by the pressure sensor may further include height changes over the predetermined period of time.

In some embodiments, the processor of the wearable device may compare the data collected by the acceleration sensor (the body direction change) and/or the data collected by the pressure sensor (the body height change) with a threshold to determine whether the detected movement from step 408 is a fall movement. The threshold may include a predetermined change in height and/or a predetermined change in direction. The threshold may be determined based on the user information including the gender information and/or the height information. The threshold for a male user may be different from the threshold for a female user. The threshold may be consistent with the calculated result (larger than the threshold) from step 406. The comparison may distinguish a fall movement from other movements. In one example, the processor of the wearable device may determine the threshold based on height information input by the user, such that a sit-down movement may be detected and determined as below the threshold and may not trigger a call for help. In another example, the processor of the wearable device determines the threshold based on gender information input by the user and on average height information of people in the area location, such that a sit-down movement may be detected and determined as below the threshold and may not trigger a call for help.

In some embodiments, the threshold and the predetermined pattern may be a part of the instructions stored in the memory of the wearable device.

In some embodiments, if the processor of the wearable device determines that a body direction and a body height change, proceed to step 410; if the processor of the wearable device does not determine that a body direction and a body height change, the sensors of the wearable device may keep collecting sensor data.

At step 410, the processor of the wearable device may confirm if help is needed. If the processor of the wearable device confirms need for help, proceed to step 305; if the processor of the wearable device does not confirm need for help, the sensors of the wearable device may keep collecting sensor data.

In one example, the processor of the wearable device may confirm need for help by continuously collecting/processing data as indicated in previous steps for a predetermined period of time and determining that the person does not get up based on the continuously collected/processed data. The predetermined period of time may be 30 seconds.

At step 305, the processor of the wearable device may transmit a signal. In one example, the processor may control an antenna to transmit a signal. In another example, the processor may control an antenna controller module to communicate with and/or control an antenna. The antenna controller module may be a Bluetooth controller module. The signal may be transmitted through a communication network including, for example, Bluetooth, Low Energy Bluetooth, Wifi, 3G, 4G, LTE, WiMax, radio, satellite, or any combination thereof.

In some embodiments, the signal may include a notification indicating that the person falls if step 305 is triggered by step 410, or a notification indicating that the person is not wearing the wearable device if step 305 is triggered by step 314. The notification may take the form of, for example, a text message, a multimedia message, a voice mail, a phone call, an email, an alert, an alarm, a mobile phone application notification, or any combination thereof. A receiver of the notification including, for example a caregiver, may react to the situation appropriately, such that the person receives assistance if the notification indicates that the person falls or the person is checked on if the notification indicates that the person is not wearing the wearable device.

In some embodiments, the signal may further comprise location information of the person, such that a receiver of the signal will know where to find the person based on the location information. The location information may be determined by a positioning module described in FIG. 2, a third party device described in FIG. 5, and/or an apparatus described in FIGS. 5 and 6.

Figure 5:
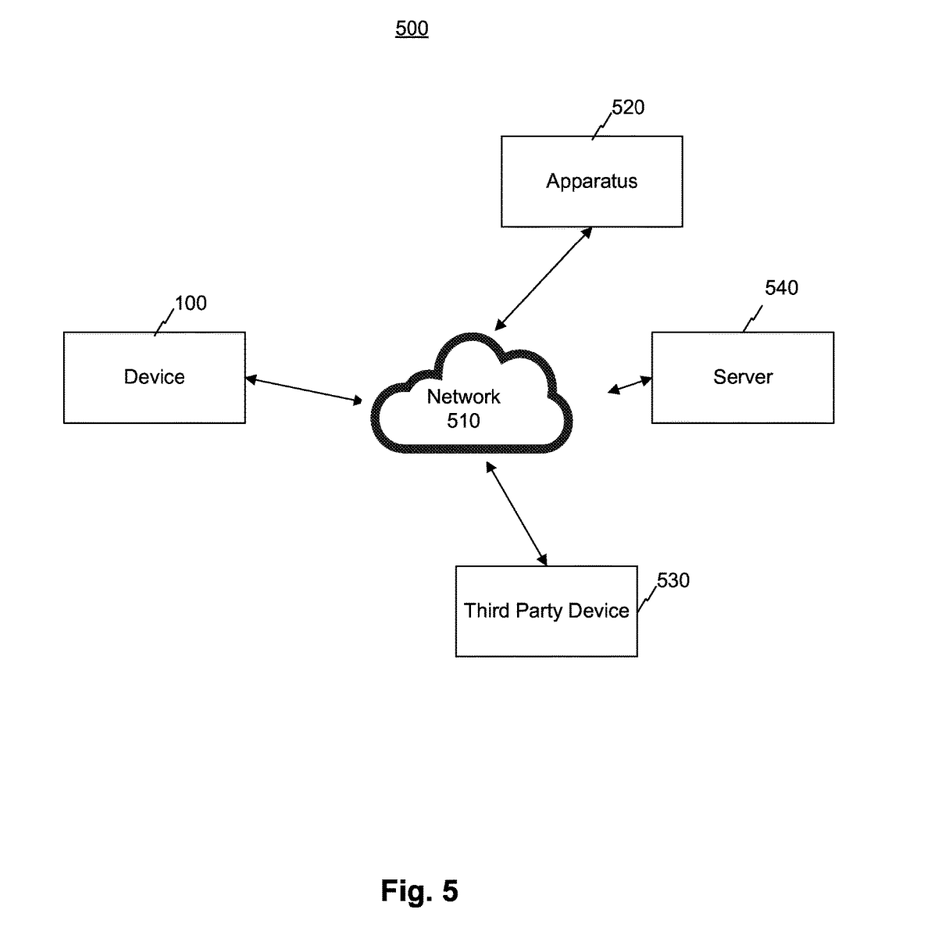
FIG. 5 is a block diagram illustrating a system for determining if a person falls and transmitting notifications according to an exemplary embodiment.

FIG. 5 is a block diagram illustrating a system 500 for determining if a person falls and transmitting notifications according to an exemplary embodiment. The system 500 may comprise a number of components. Some components may be optional.

In one embodiment, the system 500 may comprise one or more devices 100, one or more networks 510, one or more apparatus 520, one or more third party devices 530, and one or more servers 540. The device 100 may be a wearable device described in FIGS. 1-4. The apparatus 520 may comprise mobile devices and/or fixed devices. In one example, the apparatus 520 may be a mobile phone carried by a person wearing a device 100. In another example, the apparatus 520 may be a Bluetooth hub, for example the Bluetooth hub disclosed in U.S. application Ser. No. 14/639,711, titled "METHODS, DEVICES AND SYSTEMS FOR INCREASING WIRELESS COMMUNICATION RANGE," filed Mar. 5, 2015, and U.S. application Ser. No. 14/789,614, titled "METHODS, DEVICES AND SYSTEMS FOR SUPPORTING WIRELESS COMMUNICATION," filed Jul. 1, 2015. The entire contents of U.S. application Ser. Nos. 14/639,711 and 14/789,614 are incorporated herein by reference. The third party device 530 may comprise mobile devices and/or fixed devices. The third party device 530 may be used by a person or a facility including, for example, a hospital, a rescue center, a community center, or relatives of a person wearing a device 100. The network 510 may be a communication network for transmitting signals including, for example, Bluetooth, Low Energy Bluetooth, Wifi, 3G, 4G, LTE, WiMax, radio, satellite, or any combination thereof. In some embodiments, all devices connected with one or more networks 510, for example, one or more devices 100, one or more apparatus 520, one or more third party devices 530, and one or more servers 540, may communicate with one another via the network 510 by sending and/or receiving signals. The signals may include a notification indicating that the person falls, or a notification indicating that the person is not wearing the device 100. The notification may take the form of, for example, a text message, a multimedia message, a voice mail, a phone call, an email, an alert, an alarm, a mobile phone application notification, or any combination thereof. The signal may further comprise location information of the person.

In some embodiments, the device 100 may transmit a signal to the third party device 530 via the network 510. In one example, when a person wearing a device 100 falls, the device 100 may determine that the person falls and may transmit a signal to a third party device 530. The signal may include a notification indicating that a person wearing the device 100 falls, or a notification indicating that the person is not wearing the device 100. The signal may further comprise location information of the person. A user of the third party device 530 may react to the situation appropriately, such that the person receives assistance or the person is checked on.

In some embodiments, the device 100 transmits a signal to an apparatus 520 through the network 510, and then the apparatus 520 transmits the signal to the third party device 530 through the network 510. In one example, a person wearing a device 100 falls, the device 100 may determine that the person falls and may transmit a signal to the apparatus 520. The signal may include a notification indicating that a person wearing the device 100 falls, or a notification indicating that the person is not wearing the device 100. The apparatus 520 may transmit the signal to a third party device 530. A user of the third party device 530 may react to the situation appropriately, such that the person receives assistance or the person is checked on. In one example, the signal transmitted by the device 100 to apparatus 520 contains location information of the person. In another example, the signal transmitted by the device 100 to the apparatus 520 does not contain location information of the person. The apparatus 520 adds location information of the person to the signal and then transmits the signal to the third party device 530.

In some embodiments, a device 100 may communicate with an apparatus 520 via Low Energy Bluetooth.

In some embodiments, performance of a device 100 may be recorded by itself and be transmitted to a server 540. The performance may include collected sensor data, processed sensor data, determination results, or transmitted signals. Some of the determination results may be false and some of the transmitted signals may be false alarms. In one example, the server 540 may create personalized instructions based on the performance received. The personalized instructions may include personalized thresholds.

Figure 6:
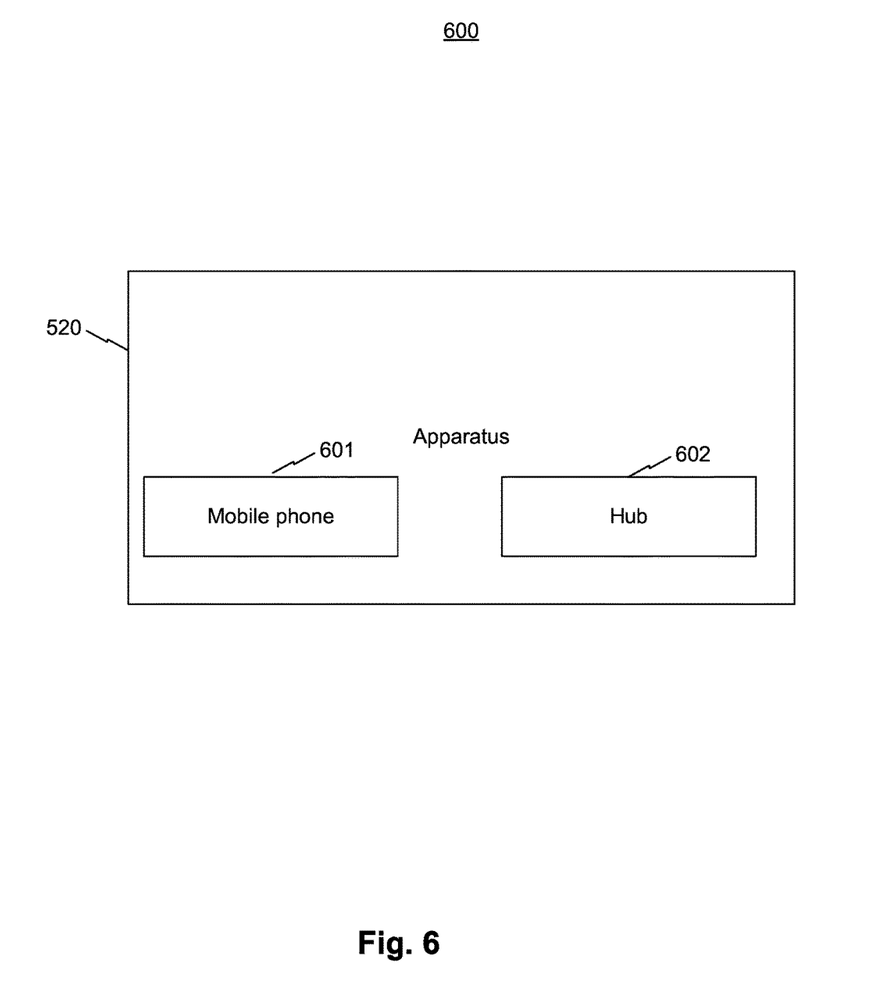
FIG. 6 is a block diagram illustrating an apparatus in a system for determining if a person falls and transmitting notifications according to an exemplary embodiment.

FIG. 6 is a block diagram illustrating an apparatus 600 in a system for determining if a person falls and transmitting notifications according to an exemplary embodiment. The apparatus 600 may comprise a number of components. Some components may be optional.

In some embodiments, an apparatus 520 may include one or more mobile phones 601 carried by a person wearing a device 100. In one example, a mobile phone application on the mobile phone may communicate with a device 100. The mobile phone 601 may also communicate with a third party device 530 by receiving and/or sending a signal. In another example, the mobile phone 601 may download updates from internet and update instructions stored in the device 100 with the updates. The updates may be new versions of instructions. The updates may be the personalized instructions. The personalized instructions may include personalized thresholds.

In some embodiments, an apparatus 520 may include one or more hubs 602, for example Bluetooth hubs as described above and in related applications. The hub 602 may be a device placed at a location and communicate with other devices via network 510. The hub 602 may communicate with a device 100. The hub 602 may also communicate with a third party device 530 by receiving and/or sending a signal. In another example, the system may also include a mobile phone 601 which communicates with the hub 602. In another example, the hub 602 may download updates from internet and update instructions stored in the device 100 with the updates. The updates may be new versions of instructions. The updates may be the personalized instructions. The personalized instructions may include personalized thresholds. In yet another example, the hub 602 may perform calculation to determine a location of a person wearing a device 100. In yet another example, apparatus 520 may be a plurality of hubs 602 forming a hub network to cover a building or an area, so that a device 100 roaming in the building or area may communicate with at least one of the hubs. Each hub 602 may have a signal coverage area no less than 100 feet in radius. The hub 602 may calculate a real-time location of the device 100 roaming in the building.

The specification has described devices, systems, and methods for detecting falls and transmitting notifications. The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include RAM, ROM, volatile memory, nonvolatile memory, hard drives, CD ROMs, DVDs, flash drives, disks, and any other known physical storage media.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:
1. A wearable device for detecting falls and transmitting notifications, comprising:
 a first sensor configured to collect acceleration data;
 at least one of:
  a second sensor configured to collect pressure data; or
  a third sensor configured to collect temperature data;
 an antenna;
 a processor;

a non-transitory computer-readable storage medium storing instructions that, when executed by the processor, cause the processor to:
receive the acceleration data and at least one of the pressure data or the temperature data;
process the acceleration data and at least one of the pressure data or the temperature data to determine real-time changes in body height and body direction of a person;
determine if the person falls based on comparing the determined real-time changes in the body height and the body direction with one or more thresholds;
determine if the person does not get up for a predetermined period of time based on continuous collection of the acceleration data and at least one of the pressure data or the temperature data; and
in response to determining that the person falls and the person does not get up, control the antenna to transmit a signal to one or more hubs, causing the one or more hubs to determine the location of the person and transmit the determined location and a notification of the fall.

2. The device of claim 1, wherein the one or more hubs comprise Bluetooth hubs.

3. The device of claim 1, wherein the each of the one or more hubs has a signal coverage area of no less than 100 feet; and the one or more hubs form a network covering a building or area at which the person roams.

4. The device of claim 1, wherein the instructions further cause the processor to filter the acceleration data with at least one of a mean filter, a low pass filter, or a high pass filter.

5. The device of claim 4, wherein the instructions further cause the processor to:
perform a root mean square calculation to filtered acceleration data to obtain a calculated result; and
compare the calculated result with a threshold.

6. The device of claim 5, wherein the instructions further cause the processor to determine whether a fall pattern exists among the acceleration data and at least one of the pressure data or the temperature data.

7. The device of claim 5, wherein the instructions further cause the processor to determine whether a detected movement is a fall movement based on the acceleration data and at least one of the pressure data or the temperature data.

8. The device of claim 1, wherein the first sensor is a 9-axis acceleration sensor comprising a 3-axis accelerometer, a 3-axis compass, and a 3-axis gyroscope.

9. A method for determining if a person falls and transmitting notifications, comprising:
collecting, by a first sensor of a wearable device, acceleration data;
collecting at least one of:
pressure data, by a second sensor of the device; or
temperature data, by a third sensor of the device;
receiving, by a processor of the device, the acceleration data and at least one of the pressure data or the temperature data;
processing, by the processor, the acceleration data and at least one of the pressure data or the temperature data to determine real-time changes in body height and body direction of a person;
determining, by the processor, if the person falls based on comparing the determined real-time changes in the body height and the body direction with one or more thresholds;
determining, by the processor, if the person does not get up for a predetermined period of time based on continuous collection of the acceleration data and at least one of the pressure data or the temperature data; and
in response to determining that the person falls and the person does not get up, controlling, by the processor, the antenna to transmit a signal to one or more hubs, causing the one or more hubs to determine the location of the person and transmit the determined location and a notification of the fall.

10. The method of claim 9, wherein the one or more hubs comprise Bluetooth hubs.

11. The method of claim 9, each of the one or more hubs has a signal coverage area of no less than 100 feet; and the one or more hubs form a network covering a building or area at which the person roams.

12. The method of claim 9, further comprising:
performing, by the processor, a root mean square calculation to collected acceleration data to obtain a calculated result;
comparing, by the processor, the calculated result with a threshold.

13. The method of claim 12, further comprising determining, by the processor, whether a fall pattern exists among the acceleration data and at least one of the pressure data or the temperature data.

14. The method of claim 12, further comprising determining, by the processor, whether a detected movement is a fall movement based on the acceleration data and at least one of the pressure data or the temperature data.

15. A system for determining if a first person falls and transmitting notifications, comprising:
a wearable first device and one or more second devices, wherein the wearable first device is configured to:
collect acceleration data;
collect at least one of pressure data or temperature data;
process the acceleration data and at least one of the pressure data or the temperature data to determine real-time changes in body height and body direction of a person;
determine if the person falls based on comparing the determined real-time changes in the body height and the body direction with one or more thresholds;
determine if the person does not get up for a predetermined period of time based on continuous collection of the acceleration data and at least one of the pressure data or the temperature data; and
in response to determining that the person falls and the person does not get up, transmit a signal to the one or more second devices, causing the one or more second devices to determine the location of the person and transmit the determined location and a notification of the fall to a third device, wherein the second device comprises a hub.

16. The system of claim 15, wherein the third device is used by a hospital, by a rescue center, or by a second person who knows the first person.

17. The system of claim 15, wherein the first device and the second device communicate via Low Energy Bluetooth.

18. The system of claim 15, wherein the second device updates the first device.

19. The system of claim 15, wherein the second device communicates with a plurality of first devices in an area.

20. The system of claim 15, wherein each of the one or more second devices has a signal coverage area of no less than 100 feet; and the one or more second devices form a network covering a building or area at which the person roams.

\* \* \* \* \*